United States Patent
McEvoy et al.

(10) Patent No.: US 10,851,905 B2
(45) Date of Patent: Dec. 1, 2020

(54) MULTI-MOTION FAIL-SAFE OPERATING GATE VALVE

(71) Applicant: GE Oil & Gas Pressure Control LP, Houston, TX (US)

(72) Inventors: Travis Kyle McEvoy, Houston, TX (US); Keith M. Adams, Katy, TX (US); Jeremy Choate, Houston, TX (US); Guy Mitelman, Houston, TX (US); Paul Cody, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 16/433,152

(22) Filed: Jun. 6, 2019

(65) Prior Publication Data

US 2019/0376610 A1   Dec. 12, 2019

Related U.S. Application Data

(60) Provisional application No. 62/681,211, filed on Jun. 6, 2018.

(51) Int. Cl.
*F16K 31/04* (2006.01)
*E21B 34/06* (2006.01)

(52) U.S. Cl.
CPC .......... *F16K 31/047* (2013.01); *E21B 34/066* (2013.01)

(58) Field of Classification Search
USPC ........................................................ 251/89
See application file for complete search history.

(56) References Cited

U.S. PATENT DOCUMENTS

| | | | | |
|---|---|---|---|---|
| 2,630,832 A | * | 3/1953 | Lutherer | F16K 31/05 251/69 |
| 3,989,223 A | * | 11/1976 | Burkhardt | F16K 31/163 251/58 |
| 4,125,790 A | * | 11/1978 | Stratienko | F16D 21/06 251/129.03 |
| 4,309,022 A | | 1/1982 | Reinicke | |
| 4,809,733 A | | 3/1989 | Hawkins | |
| 5,195,721 A | | 3/1993 | Akkerman | |
| 6,129,333 A | * | 10/2000 | Ma | F16K 31/56 251/68 |
| 6,981,428 B2 | | 1/2006 | Donald | |

(Continued)

OTHER PUBLICATIONS

International Search Report and Written Opinion dated Aug. 22, 2019 in corresponding PCT Application No. PCT/US19/35714.

(Continued)

*Primary Examiner* — Daphne M Barry
(74) *Attorney, Agent, or Firm* — Hogan Lovells US LLP

(57) ABSTRACT

A valve assembly includes a valve body and a valve member configured to translate between an open and a closed position. The valve assembly also includes a bonnet coupled to the valve body and a valve stem coupled to the valve member. The valve assembly also includes an actuator coupled to the bonnet. The actuator includes a first drive mechanism positioned to translate a first driving force to the valve stem, the first drive mechanism being in operation during a normal operating condition. The actuator also includes a second drive mechanism positioned to translate a second driving force to the valve stem, the second drive mechanism being in operation during a fail-safe operating condition.

10 Claims, 9 Drawing Sheets

(56) References Cited

U.S. PATENT DOCUMENTS

| | | |
|---|---|---|
| 8,973,451 B2 | 3/2015 | Oswald |
| 2006/0243937 A1 | 11/2006 | Hoang |
| 2010/0236632 A1 | 9/2010 | Jakobsen |
| 2014/0238009 A1 | 8/2014 | Hoglund |
| 2015/0198186 A1 | 7/2015 | McEvoy |
| 2017/0138377 A1 | 5/2017 | Huseman |
| 2018/0058602 A1 | 3/2018 | Yates |

OTHER PUBLICATIONS

Olivier Tisserand, "Fail-safe Actuators: When Failure is Not an Option," Jun. 2, 2014, https://www.indelac.com/blog/when-failure-is-not-an-option-fail-safe-actuators, 5 pages.

\* cited by examiner

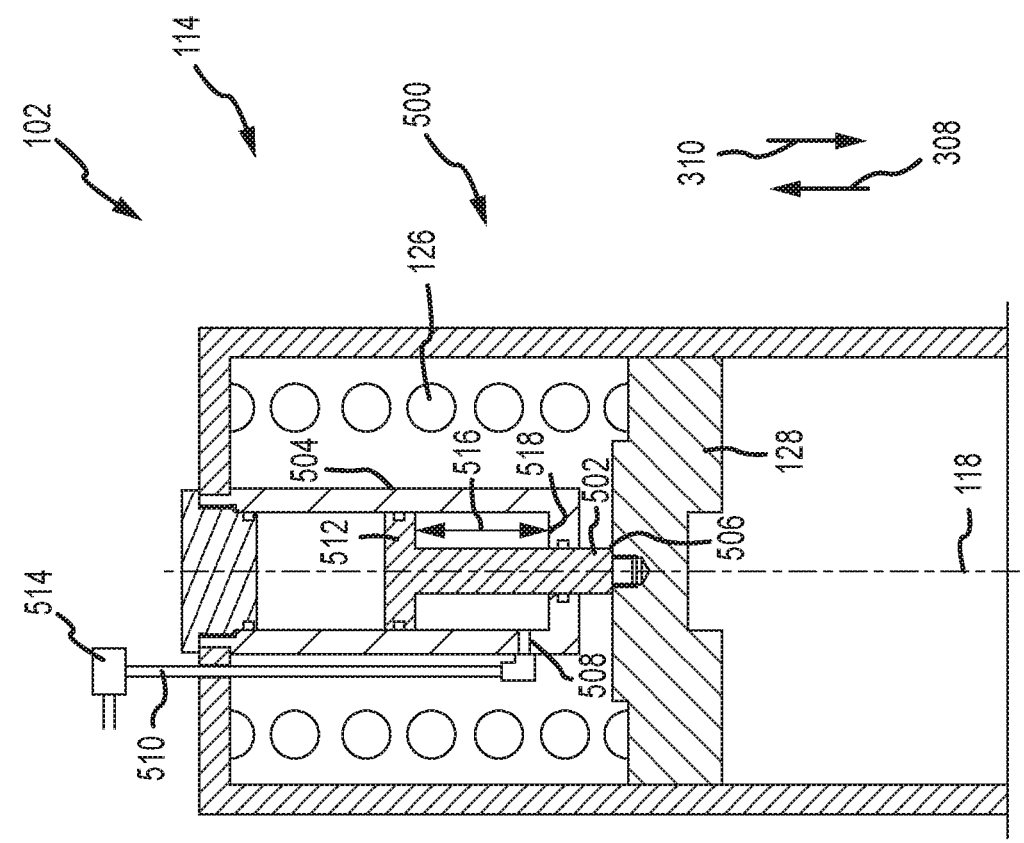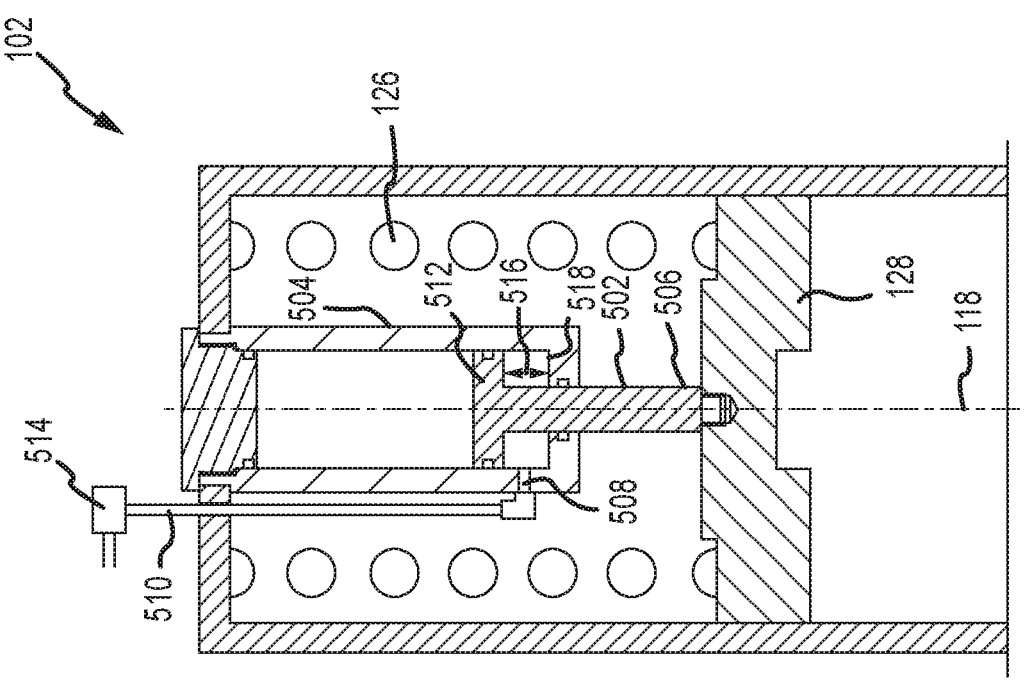
FIG. 5A
FIG. 5B

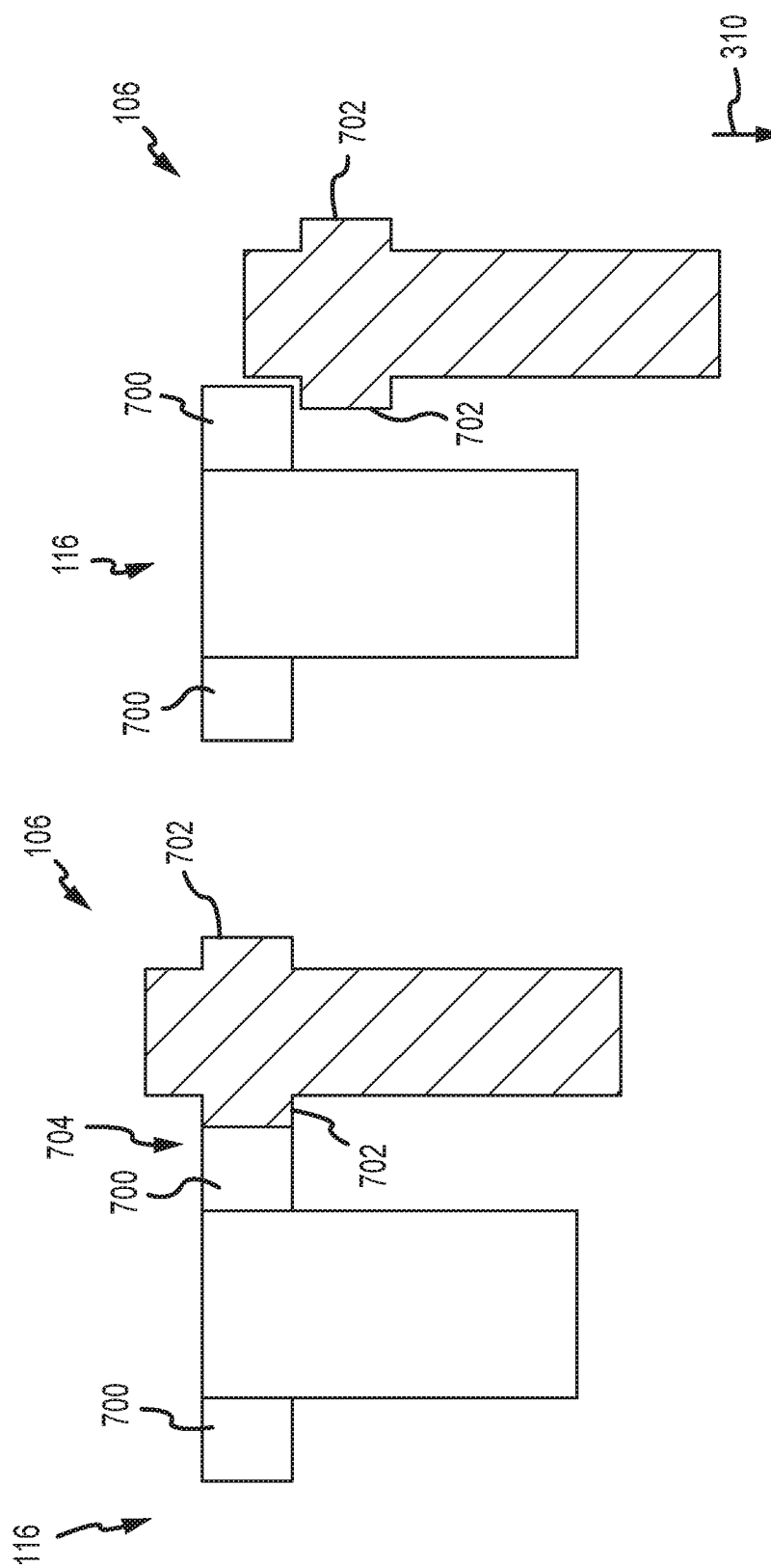

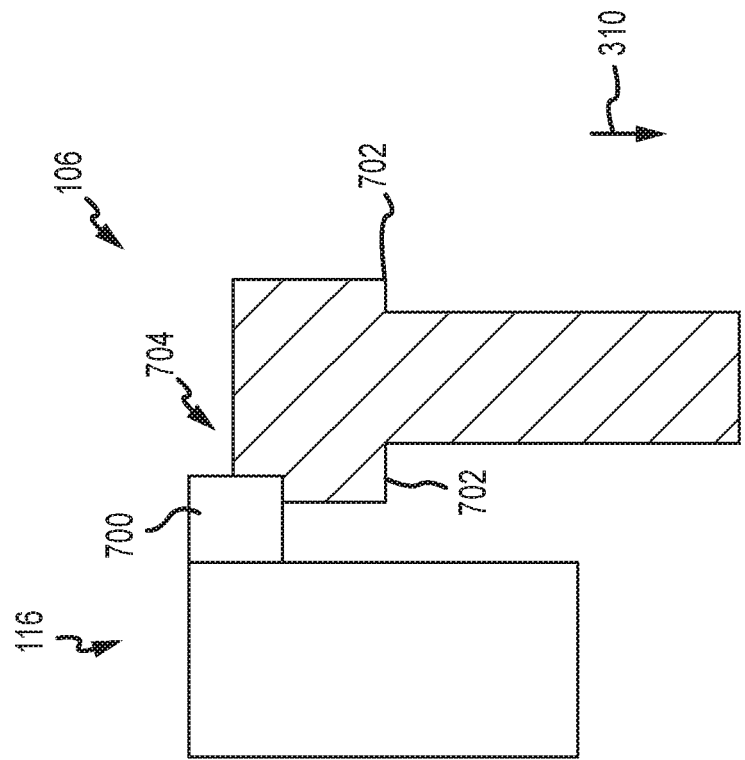
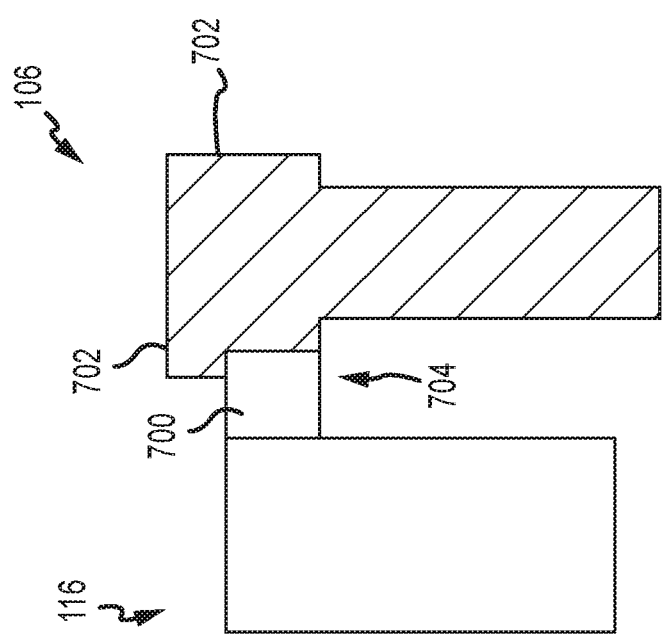
FIG.8B
FIG.8A

MULTI-MOTION FAIL-SAFE OPERATING GATE VALVE

CROSS REFERENCE TO RELATED APPLICATIONS

This application claims priority to and the benefit of U.S. Provisional Application Ser. No. 62/681,211 filed Jun. 6, 2018 titled "MULTI-MOTION FAIL-SAFE OPERATING GATE VALVE" the full disclosure of which is hereby incorporated herein by reference in its entirety for all purposes.

BACKGROUND

1. Field of Invention

This disclosure relates in general to oil and gas tools, and in particular, to systems and methods for operating valves.

2. Description of the Prior Art

In oil and gas production, valves may be used to regulate the flow of fluids through one or more wellbore tubulars. Often, the fluids may be under high pressure. To overcome these pressures, valves may include actuators that use high torque operators in order to "crack" or otherwise begin movement of valve members between open and closed positions. As a result, electric actuators are not often used for high torque scenarios due to the extensive gear arrangements for converting the typically high RPM electric motors into suitable high torque output motors. Furthermore, in various embodiments, valves may be equipped with safety mechanisms that move the valves to a closed position upon detection of one or more predetermined events. Typical actuators overcome these safety mechanisms in order to operate the valves in normal operations, which as described above, may further lead to high torque scenarios where electric motors and many other rotary drive mechanisms are not suitable.

SUMMARY OF THE DISCLOSURE

Applicants recognized the problems noted above herein and conceived and developed embodiments of systems and methods, according to the present disclosure, for operating a valve assembly using a multi-mode actuator.

In an embodiment, a valve assembly includes a valve body and a valve member configured to translate between an open and a closed position within the valve body. The valve assembly also includes a bonnet coupled to the valve body and a valve stem coupled to the valve member and extending through a bore of the bonnet. The valve assembly also includes an actuator coupled to the bonnet. The actuator includes a first drive mechanism positioned to translate a first driving force to the valve stem, the first drive mechanism being in operation during a normal operating condition. The actuator also includes a second drive mechanism positioned to translate a second driving force to the valve stem, the second drive mechanism being in operation during a fail-safe operating condition.

In another embodiment, an actuator for use with a valve includes a first drive mechanism for applying a first driving force to a valve stem, the first drive mechanism arranged within an actuator housing and configured to couple to the valve stem at an interface. The actuator also includes a second drive mechanism for applying a second driving force to the valve stem, the second drive mechanism arranged, at least partially, within the actuator housing and configured to couple to the valve stem at a second interface. The actuator further includes a retention member associated with the second drive mechanism, the retention mechanism releasably maintaining the second drive mechanism at a first position, where the second driving force acts on the retention member, and enabling movement to a second position, where the second driving force acts on the valve stem.

In an embodiment, a method for operating a valve includes securing a second drive mechanism in a first position, the second drive mechanism interfacing with a valve stem to provide a second driving force during fail-safe operating conditions, the first position restricting the second driving force. The method also includes operating the valve using the first drive mechanism, the first drive mechanism interfacing with the valve stem to provide a first driving force during normal operating conditions. The method further includes determining a fail-safe operating condition has occurred. The method also includes operating the valve using the second drive mechanism.

BRIEF DESCRIPTION OF THE DRAWINGS

The present technology will be better understood on reading the following detailed description of non-limiting embodiments thereof, and on examining the accompanying drawings, in which:

FIGS. 5A and 5B are schematic cross-sectional views of an embodiment of an actuator having a retention member, in accordance with embodiments of the present disclosure;

FIGS. 7A and 7B are schematic cross-sectional views of an embodiment of an interface between a motor and a valve stem, in accordance with embodiments of the present disclosure;

FIGS. 8A and 8B are schematic cross-sectional views of an embodiment of an interface between a motor and a valve stem, in accordance with embodiments of the present disclosure.

DETAILED DESCRIPTION OF THE INVENTION

Figure 1:
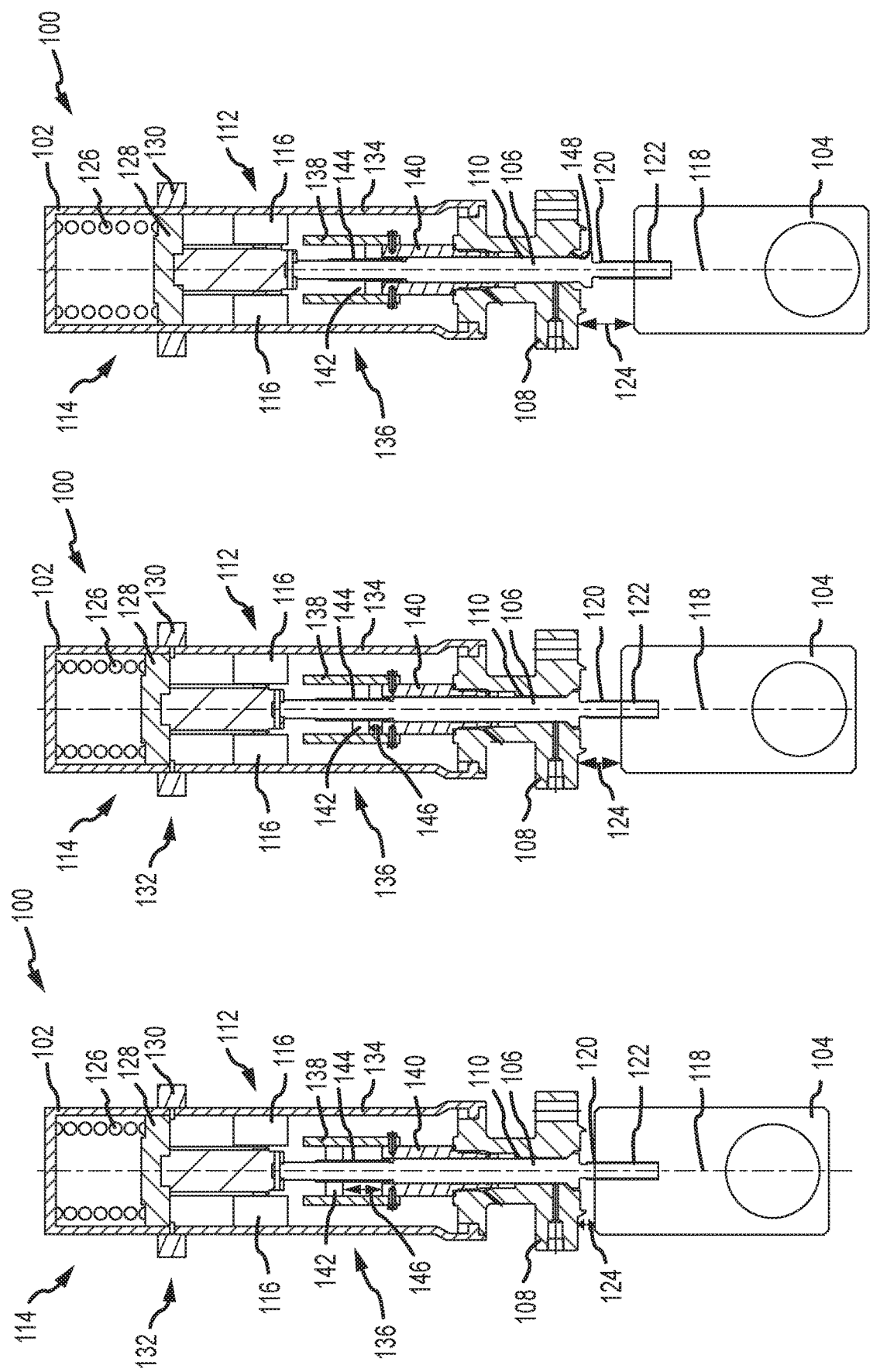
FIGS. 1A-1C are schematic cross-sectional views of an embodiment of a valve assembly including a multi-mode operation actuator, in accordance with embodiments of the present disclosure.

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present invention are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations.

Embodiments of the present disclosure are directed toward systems and methods for a multi-motion fail safe operating valve in which two different drive mechanisms, which may use different drive modes, may be integrated into a single valve assembly. In various embodiments, a first mode may be utilized during normal operating conditions and a second mode may be utilized during a "fail-safe" or "emergency" operating condition. In certain embodiments, a biasing member, such as a spring, drives axial movement of a valve stem in the fail-safe operating condition. The spring may be compressed and then maintained in a compressed position by a plate held in position by a retention member, which may be mechanical, electric, hydraulic, or the like. In operation, once a condition to activate the fail-safe mode is detected, the retention member may release the plate, enabling the spring to drive the valve stem, and associated valve member, into a closed position. Accordingly, different mechanisms may be utilized during normal operation and fail safe operation and those mechanisms may be particularly selected based on their characteristics.

In an embodiment, a multi-motion fail-safe operating valve including a pair of different drive mechanisms may be utilized to transition a valve between an open position and a closed position. In various embodiments, one of the drive mechanisms is used for the "fail-safe" or predetermined movement of the valve and a different drive mechanism is used for normal valve operations. These drive mechanisms may be decoupled from one another such that operation of the drive mechanism associated with the fail-safe operation may commence while operation of the drive mechanism associated with normal operation is in use, without damaging or otherwise affecting the drive mechanism associated with normal operation. In other words, the fail safe may include and maintain an unobstructed or otherwise unencumbered operation, even during normal operations, such as a mid-stroke point of the valve. In various embodiments, the drive mechanisms may include a rotary drive mechanism and a linear drive mechanism. It should be appreciated that the linear drive mechanism may be associated with either of the fail-safe operation or normal operations. Additionally, the rotary drive mechanism may be associated with either of the fail-safe operation or normal operations. In operation, one or more interfaces between a valve stem and the drive mechanism associated with normal operations may be aligned. Alignment of the interfaces enables normal operations to commence using the drive mechanism. When the fail-safe drive mechanism is initiated, the alignment between the interfaces may be removed. In other words, the interfaces may no longer align such that operation of the drive mechanism associated with normal operation is not transmitted to the valve stem. However, the drive mechanism may continue to operate. In this manner, the fail-safe drive mechanism may transition the valve to a desired position (e.g., closed) by decoupling the valve stem from the drive mechanism for normal operations as the fail-safe drive mechanism transitions the valve to the desired position. In this manner, the pair of drive mechanisms may be selectively decoupled from the valve stem to enable both normal and fail-safe operation using different drive mechanisms.

In certain embodiments, the retention member includes an actuator, such as a solenoid, that extends through an actuator housing at a predetermined position. The predetermined position may be associated with a location where the biasing member, which may be a spring, is compressed to a desired length. The retention member may block linear movement of a plate, which may be coupled to both the biasing member and the valve stem, until a signal is received. For example, in embodiments, an electric signal may be indicative of operation in the fail-safe mode that disengages the retention member to enable the biasing member to expand and drive the plate axially to move the valve member toward the closed position. In certain embodiments, the retention member may include hydraulic pressure or pneumatic pressure. For example, a piston may be coupled to the plate and hydraulic pressure within a chamber may compress the spring. The hydraulic pressure within the chamber may keep the plate at a position until the hydraulic fluid is removed from the chamber, for example via a flow path, to enable the biasing member to expand and drive axially drive the plate. Furthermore, in embodiments, a vacuum may be drawn when the piston drives the plate upward to compress the spring and the vacuum may maintain the spring position until the vacuum is released. In this manner, various configurations may be utilized to maintain a position of a plate until the fail-safe operating condition is detected.

FIGS. 1A-1C are cross-sectional side views of embodiments of valve assemblies 100 including an actuator 102 and a valve member 104 coupled to a valve stem 106. It should be appreciated that various components of the valve assembly have been removed for clarity, such as the valve body. The illustrated actuator 102 is coupled to a bonnet 108 and the valve stem 106 extends through a bore 110 formed in the bonnet 108. In embodiments, the bonnet 108 may be coupled to a valve body, for example via fasteners or the like. The actuator 102 controls a position of the valve member 104. For example, the valve member 104 may be in an open position, a closed position, or somewhere between. The actuator 102 provides a force to the valve stem 106, which is translated to the valve member 104, which is illustrated as a gate in FIGS. 1A-1C. In the illustrated embodiment, the actuator 102 includes a first drive mechanism 112 and a second drive mechanism 114. Both the first drive mechanism 112 and the second drive mechanism 114 may be utilized to change a position of the valve member 104. For example, in various embodiments, the first drive mechanism 112 may include one or more electric motors 116 to drive movement of the valve member 104 via the valve stem 106. For example, the electric motors 116 may include splines that interact with splines arranged along the valve stem 106. As a result, rotational forces of the electric motors 116 are translated to the valve stem 106 to drive rotation of the valve stem 106 about an axis 118. Because the illustrated valve assembly 100 is non-rising stem valve, the valve stem 106 may remain axially static during operation of the first drive mechanism 112 while the valve member 104 moves. For example, valve stem threads 120 on the valve stem 106 may mate with member threads 122 of the valve member 104. Rotation of the valve stem 106 may drive movement of the valve member 104 along the threads. For example, in the embodiments illustrated in FIGS. 1A and 1B, a distance 124 between the bonnet 108 and the valve member 104 changes as the valve member 104 is driven toward a closed position. However, as illustrated, the axial position of the valve stem 106 does not change.

FIG. 1A illustrates the valve member 104 in an open position, FIG. 1B illustrates the valve member 104 mid-stroke, and FIG. 1C illustrates the valve member in a closed position (and further illustrates the valve assembly 100 operating in a fail-safe condition). In operation, the first drive mechanism 112 may be utilized to translate the valve member 104 between the open position and the closed position, as noted above. However, in various embodiments, the valve assembly 100 may also operate in a fail-safe condition where rapid closure of the valve member 104 may be desirable. Movement of the valve member 104 during the fail-safe operating condition may be facilitated by the second drive mechanism 114. In the illustrated embodiment, the second drive mechanism 114 uses a biasing member 126, such as a spring, to provide a force to a plate 128 coupled to the valve stem 106. This force drives linear movement of the valve member 106 along the axis 118 to move the valve member 104 into the closed position. Accordingly, during detection of an operating condition that may be determined to be the fail-safe operating condition, such as an over-pressure scenario or the like, the actuator 102 may switch to utilize operation of the second drive mechanism 114 instead of the first drive mechanism 112.

In the illustrated embodiment, the second drive mechanism 114 is a linear actuator that translates the valve stem 106 along the axis 118. As opposed to operation by the first drive mechanism 112, wherein the valve stem 106 is axially static and rotates about the axis 118, operation via the second drive mechanism 114 drives axial movement of the valve stem 106 along the axis 118. This axial movement moves the valve member 104 into position, even if the distance 124 has increased from a fully open position to some mid-stroke position. As noted above, it should be appreciated that, in other embodiments, the first drive mechanism 112 may be an axial mechanism and the second drive mechanism 114 may be a rotary drive mechanism. Furthermore, in embodiments, both may be the same type of drive mechanism (e.g., both rotary, both linear, etc.) that utilizes a different driving force.

The illustrated plate 128 associated with second drive mechanism 114 may be maintained in position by a retention member 130, which is solenoid in the illustrated embodiment. The biasing member 126, illustrated as a spring, may be compressed, and at a compression point 132 the retention member 130 may be activated to secure the plate 128 into position, thereby setting the biasing member 126. As illustrated, the retention member 130 extends through an actuator housing 134. However, it should be appreciated that, in other embodiments, the retention member 130 may be fully arranged within the actuator housing 130 or external to the actual housing 134.

In various embodiments, it may be undesirable for the second drive mechanism 114 to lower the valve member 104 beyond a certain position within the valve body, as doing so may damage the valve seats or the valve member 104. Accordingly, embodiments of the present disclosure may include a valve stroke system 136 to stop downward movement of the valve member 104 beyond a set point or predetermined point. The illustrated valve stroke system 136 includes a bracket 138 coupled to a downstop 140, which may also be used as a packing retention feature. The downstop 140 is arranged at least partially within the bonnet 108, in the illustrated embodiment, and extends axially along the valve stem 106. The bracket 138 of the illustrated embodiment is mechanically coupled to the downstop 140, for example, via fasteners. However, it should be appreciated that other coupling mechanisms may be utilized. The valve stroke system 136 further includes a stop member 142, which in the illustrated embodiment is a hexnut, arranged along a stroke thread portion 144 of the valve stem 106. In various embodiments, the stop member 142 is configured to move axially along the valve stem 106 in response to rotation of the valve stem 106, for example, via the drive force from the first drive mechanism 112. In certain embodiments, the stroke thread portion 144 may include threads having the same pitch as the valve stem threads 120, and as a result, the stop member 142 moves at approximately the same rate as the valve member 104. Accordingly, an axial distance 146 between the downstop 140 and the stop member 142 may change in response to a position of the valve member 104. That is, the axial distance 146 is greater when the valve member 104 is in the open position than when the valve member 104 is mid-stroke. Furthermore, the axial distance 146 may be approximately zero when the valve member 104 is in the closed position. However, in various embodiments, the axial distance 146 may still provide for axial movement of the valve member 104 in the closed position such that the valve stem 106 is removed from a backstop 148 of the bonnet 108, as illustrated in FIG. 1C.

Operation of the valve assembly 100 is illustrated between FIGS. 1A-1C. For example, the valve assembly 100 in FIG. 1A illustrates the valve member 104 in the open position. Accordingly, the axial distance 146 shown in FIG. 1A is larger than the axial distance shown in FIG. 1B, where the valve member 104 is illustrated mid-stroke. This difference is further illustrated by the distance 124 between the bonnet 108 and the valve member 104. In operation, the first drive mechanism 112 may rotate the valve stem 106, which drives axial movement of both the stop member 142 and the valve member 104. As illustrated in FIG. 1B, at the mid-stroke position, the valve member 104 is lowered along with the stop member 142. Due to the normal operation of the valve assembly 100, the retention member 130 maintains the compression point 132 of the biasing member 126, via the plate 128. In other words, the position of the plate 128 does not change between FIGS. 1A and 1B. In contrast, FIG. 1C illustrates removal of the retention member 130 such that the plate 128 is driven axially by the biasing member 126. In various embodiments, as noted above, the retention member 130 may be a solenoid that receives an electrical signal, such as a signal indicative of an overpressure scenario or the like, which retracts or otherwise removes the retention member 130 from blocking movement of the plate 128. Adjusting operation from the first drive mechanism 112 to the second drive mechanism 114 may decouple the first drive mechanism 112 from the valve stem 106 or may deactivate the first drive mechanism 112. As illustrated, the force from the biasing member 126 axially drives the valve stem 106 in the downward direction, which brings the stop member 142 into contact with the downstop 140. Furthermore, the distance 124 is increased when compared to FIGS. 1A and 1B. Accordingly, embodiments of the present disclosure may include the valve assembly 100 having the actuator 102 that enables a multi-mode operation between two different driving mechanisms to facilitate operation in a variety of different operating conditions.

Figure 2:
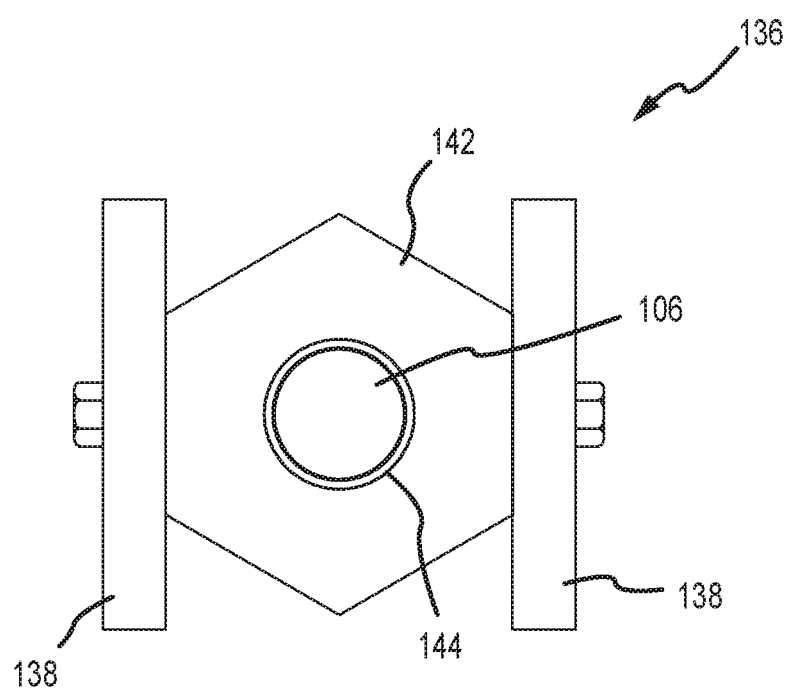
FIG. 2 is a top plan view of an embodiment of a valve stroke system, in accordance with embodiments of the present disclosure.

FIG. 2 is a top plan view of an embodiment of the valve stroke system 136. As described above, in various embodiments, the valve stroke system 136 enables the stop member 142 to move along the stroke thread portion 144 in response to rotation of the valve stem 106. This movement reduces the axial distance 146 and may limit downward movement of the valve stem 106 when the valve stem 106 is driven by the second drive mechanism 114. The illustrated embodiment includes the stop member 142, shown as a hexnut. However, it should be appreciated that the stop member 142 can be any size, such as a square nut or the like, and that the hexnut is shown for illustrative purposes only. The bracket 138 is positioned about the stop member 142 and blocks rotation of the stop member 142. In other words, rotation of the valve stem 106 drives movement of the stop member 142, and not rotation of the stop member 142. Accordingly, a valve stroke length may be restricted by the stop member 142 and may be selected to correspond to a position of the valve member 104.

Figure 3A:
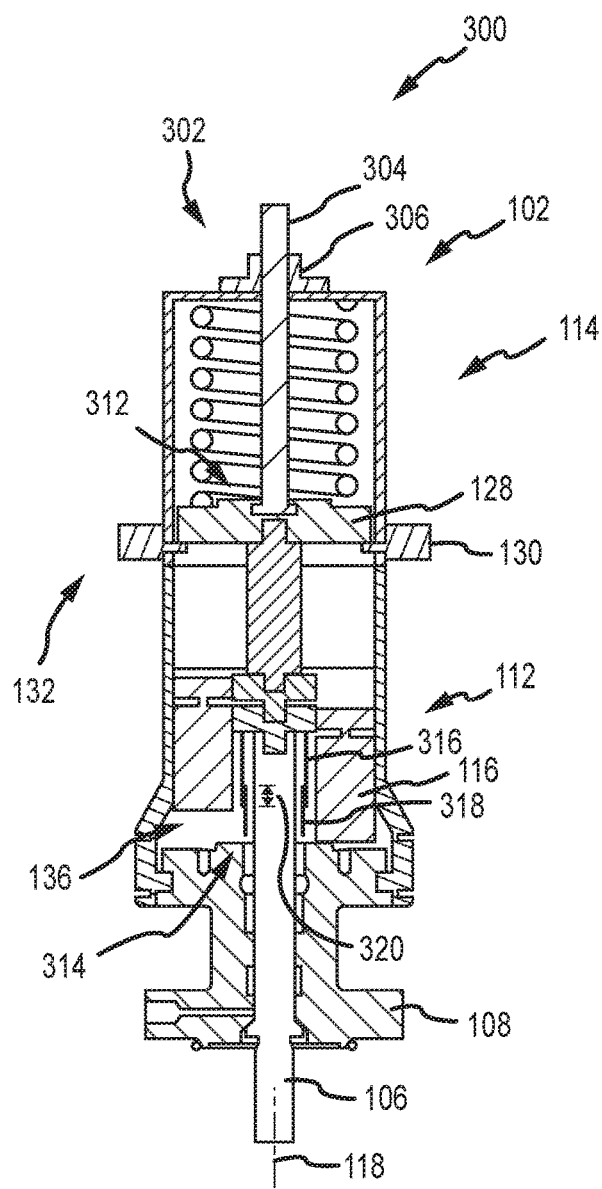
FIGS. 3A and 3B are schematic cross-sectional views of an embodiment of a valve assembly including a multi-mode operation actuator, in accordance with embodiments of the present disclosure.
Figure 3B:
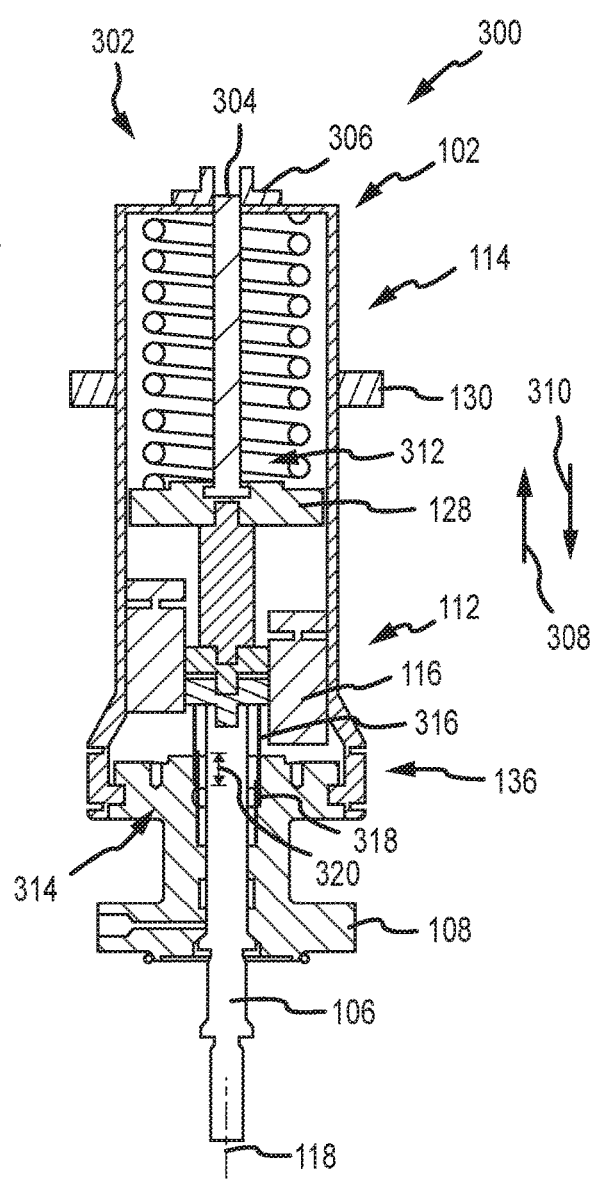

FIGS. 3A and 3B are cross-sectional side views of embodiments of a valve assembly 300. It should be appreciated that several features are shared between the valve assembly 100 and the valve assembly 300, such as the actuator 102, valve member 104, valve stem 106, bonnet 108, and the like. The valve assembly 300 further includes the first drive mechanism 112 and the second drive mechanism 114, which may independently drive movement of the valve member 104 during normal operating conditions and a fail-safe operating condition. In various embodiments, as described above, the first drive mechanism 112 includes one or more electric motors 116 that interact with splines of the valve stem 106 to facilitate rotational movement of the valve stem 106, which may drive movement of the valve member 104, for example, via interaction between the valve stem threads 120 and the member threads 122. Further included is the retention member 130, which is illustrated as a solenoid valve extending through the actuator housing 134, to hold the plate 128 at the compression point 132.

FIGS. 3A and 3B further illustrate a biasing member compression mechanism 302, illustrated as a rod 304 coupled to the plate 128 that interacts with a draw mechanism 306, which is a ball screw in the illustrated embodiment. The draw mechanism 306 may be any type of fitting that converts rotational movement in linear movement. Accordingly, as the draw mechanism 306 rotates, the rod 304 is pulled in an upward direction 308, which also draws the plate 128 in the upward direction 308. Moving the plate 128 in the upward direction 308 compresses the biasing member 126, which is illustrated as a spring. Once at the compression point 132, the retention member 130 may hold the plate 128 in position.

As noted above, in operation, the release of the retention member 130 enables the biasing member 126 to drive the plate 128 in a downward direction 310, opposite the upward direction 308, along the axis 118. However, it may be undesirable to maintain the coupling between the rod 304 and the plate 128 during operation of the second drive mechanism 114. Accordingly, in various embodiments, a disconnect coupling 312 maintains the connection between the rod 304 and the plate 128. The disconnect coupling 312 may include offset arms that may be quickly disengaged, for example, via rotation having a certain range. In this manner, for example, once the plate 128 is maintained by the retention member 130, the rod 304 may be decoupled from the plate 128.

FIG. 3B illustrates operation in the fail-safe mode. As shown, the retention member 130 retracts and the plate 128 moves in the downward direction 310, via the force from the biasing member 126, to drive axial movement of the valve member 104. In the illustrated embodiment, splines of the valve stem are decoupled from splines of the electric motors 116 of the first drive mechanism 112. Accordingly, the electric motors 116 may continue to operate. In certain embodiments, movement of the rod 304 may also provide an indication that the fail-safe operating mode has occurred. For example, in the illustrated embodiments, the rod 304 of FIG. 3A is visible through the draw mechanism 306, while it is not visible in FIG. 3B, but is notably still coupled to the draw mechanism 306. However, in embodiments, the rod 304 may be completely decoupled from the draw mechanism 306.

Further illustrated in FIGS. 3A and 3B is the valve stroke system 136. However, as opposed to the system of FIGS. 1A-1C, the illustrated valve stroke system 136 interacts with the bonnet 108. In the illustrated embodiment, the valve stroke system 136 includes an adjustable downstop 314, which includes a first sleeve 316 and a second sleeve 318. The second sleeve 318 is threadingly coupled to an inner diameter of the first sleeve 316 such that rotation of the valve stem 116 drives the second sleeve 318 axially downward relative to the first sleeve 316. As a result, an overlap distance 320 between the first sleeve 316 and the second sleeve 318 may change as the valve member 104 moves. As described above, the location of the second sleeve 318 may limit axial movement of the valve stem 106, which prevents overclosure or damage to valve member 104. In this manner, the stroke of the valve stem 106 may be limited due to a position of the adjustable downstop 314.

Figure 4A:
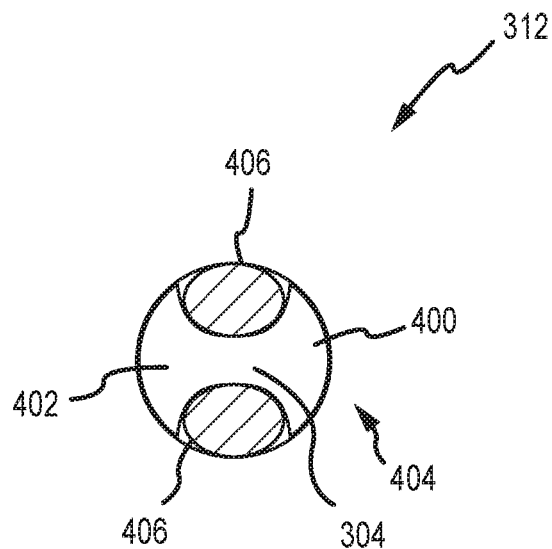
FIGS. 4A and 4B are top plan views of an embodiment of a disconnect coupling, in accordance with embodiments of the present disclosure.
Figure 4B:
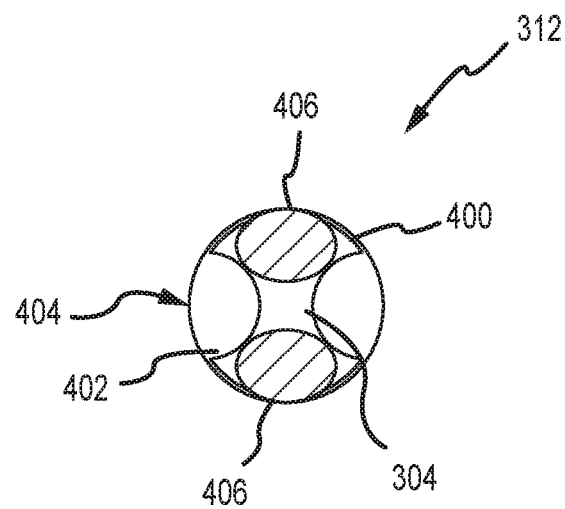

FIGS. 4A and 4B are top plan views of the disconnect coupling 312. In the illustrated embodiment, the rod 304 includes extensions 400, 402 that align with slots 404 formed in the plate 128. In the embodiment of FIG. 4A, the slots 404 and the extensions 400, 402 are aligned. Thereafter, the extensions 400, 402 may extend into the plate 128, and upon rotation, may be substantially aligned with blocking features 406. The blocking features 406 may block axial movement of the rod 304 with respect to the plate 128. In the illustrated embodiment, a 90 degree rotation facilitates removal of the rod 304 from the plate 128. However, it should be appreciated that any configuration, number of extensions 400, 402 or slots 404 may be utilized in order to provide the disconnect coupling 312.

FIGS. 5A and 5B are cross-sectional view of an embodiment of the actuator 102 including a retention member 500. It should be appreciated that various features have been removed for clarity, but certain aspects may be shared with FIGS. 1A-1C, such as the valve member 104, the valve stem 106, the bonnet 108, and the first drive mechanism 112, among other features. In the illustrated embodiment, the second drive mechanism 114 includes the plate 128 and the biasing member 126, which is illustrated as a spring. However, it should be appreciated that a variety of different drive mechanisms may be used, such as electric, hydraulic, pneumatic, or other types of drive mechanisms.

In the embodiment of FIGS. 5A and 5B, the retention member 500 includes a piston 502 arranged within a cylinder 504, with a piston end 506 coupled to the plate 128. In various embodiments, the piston end 506 may be threaded or otherwise coupled to the plate 128. The cylinder 504 includes an inlet 508 coupled to a flow path 510, which is used to direct a pressurized fluid or gas into the cylinder 504. In the illustrated embodiment, the pressure fluid is introduced axially lower than a head end 512 of the piston 502, which drives the piston 502 in the upward direction 308 along the axis 118. Movement of the piston 502 is translated to the plate 128, which compresses the biasing member 126. In various embodiments, a valve 514, such as a relief valve, may be coupled to the flow path 510 to maintain fluidic pressure within the cylinder 504. In the event of the fail-safe operating condition, the valve 514 may enable the fluid to flow out of the cylinder 504, thereby enabling the biasing member 126 to drive the plate 128 in the downward direction 310.

In the embodiment of FIG. 5A, the biasing member 126 is not compressed and the head end 512 is arranged a piston axial distance 516 from a bottom 518 of the cylinder 504. However, as fluidic (or pneumatic) pressure is introduced to the cylinder 504, via the inlet 508, the head end 512 is driven in the upward direction 308 and the piston axial distance 516 increases, as illustrated in FIG. 5B. In various embodiments, the retention of the plate 128 is due to maintaining the fluidic pressure within the cylinder 504, for example, via the valve 514. Upon receipt of a signal, for example indicative of an overpressure scenario, the valve 514 may enable the fluid to flow out of the inlet 508, which releases the head end 512, and as a result, the plate 128.

Figure 6:
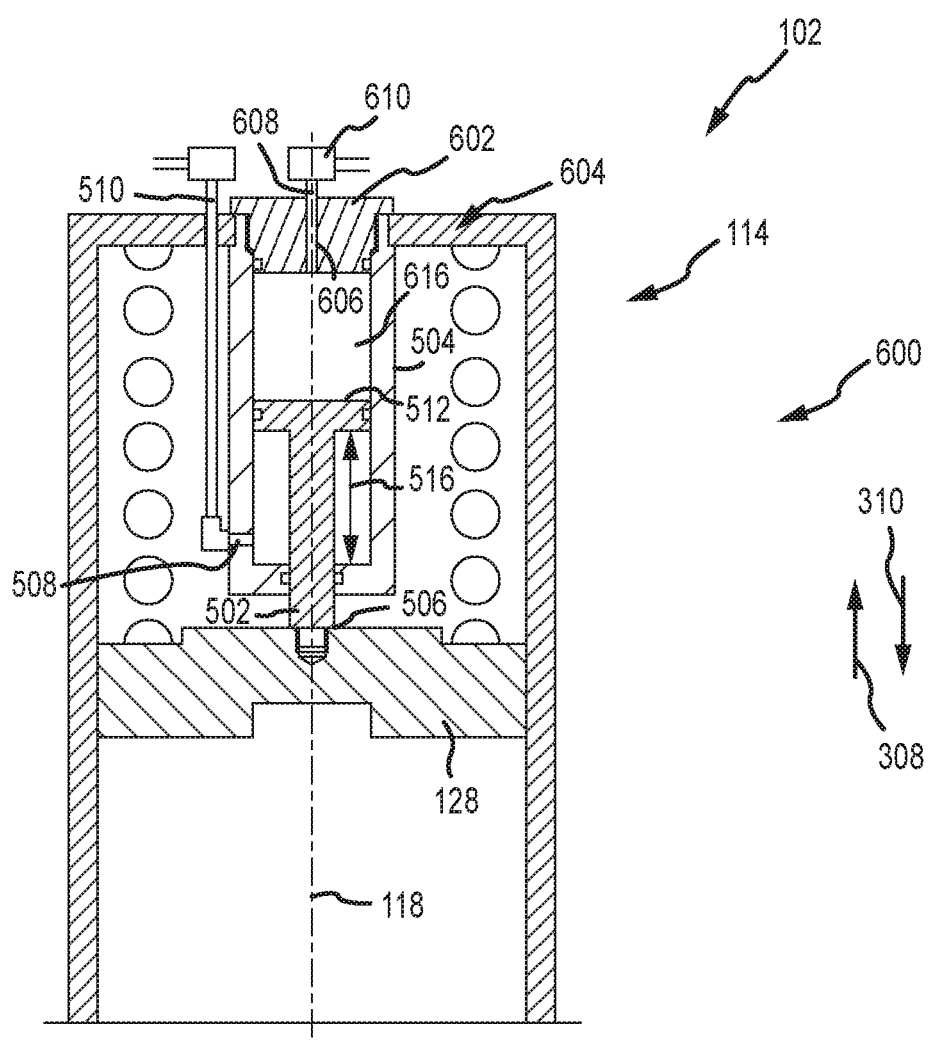
FIG. 6 is a schematic cross-sectional view of an embodiment of an actuator having a retention member, in accordance with embodiments of the present disclosure.

FIG. 6 is an embodiment of the actuator 102 including a retention member 600. The illustrated retention member 600 shares many features with the retention member 500, such as the piston 502, cylinder 504, and the like. However, a plug 602, which closes a top 604 of the cylinder 504, includes a bore 606 that forms a second flow path 608 including a second valve 610. In various embodiments, the second valve 610 may maintain a vacuum pressure in a chamber 612. The chamber 612 is located axially above the head end 512. As fluidic pressure is introduced into the cylinder 504, for example via the inlet 508, air within the chamber 612 may be driven through the second flow path 608 and through the second valve 610. The second valve 610 may block additional air from entering the chamber 612, and as a result, as the fluid is removed from the cylinder 504, the axial distance 516 may be maintained by the vacuum formed in the chamber 612. Thereafter, when the fail-safe mode is detected or altered, a signal may be transmitted to the second valve 610, which may be a solenoid valve, to release the vacuum within the chamber 612 to enable the biasing member 126 to drive the plate 128 in the downward direction 310.

FIGS. 7A and 7B are cross-sectional views of an embodiment of the electric motor 116 interacting with the valve stem 106. In the illustrated embodiment, the electric motor 116 includes splines 700 extending axially outward that interact with splines 702 of the valve stem 106. In the illustrated embodiment, there is an overlap region 704 where the splines 700 contact the splines 702 to transmit rotational forces from the electric motor 116 to the valve stem 106. In operation, the interaction between the splines 700, 702 may be utilized to drive movement of the valve member 104. FIG. 7B illustrates the electric motor 116 decoupled from the valve stem 106. For example, the valve stem 106 may be moved axially downward due to the second drive mechanism 114. As a result, the overlap region 704 is gone and there is no contact between the splines 700 and the splines 702. Accordingly, even if the electric motor 116 continues to operate (e.g., rotate the splines 700), that force will not be transmitted to the valve stem 106.

FIGS. 8A and 8B are cross-sectional views of an embodiment of the interaction between the splines 700, 702 of the electric motor 116 and the valve stem 106. As described above, the interaction may facilitate a transfer of forces from the electric motor 116 to the valve stem 106. In the embodiment of FIG. 8A, the splines 700, 702 are aligned with the overlap region 704. However, FIG. 8B illustrates movement of the valve stem 106 in the downward direction 310, for example, from the second drive mechanism 114. In this embodiment, the splines 700, 702 still overlap at the overlap region 704. As a result, forces from the electric motor 116 may still be transmitted to the valve stem 106. Accordingly, in various embodiments, operation of the second drive mechanism 114 may deactivate operation of the first drive member 112. That is, the electric motor 116 may stop rotating the splines 700, and as a result, interaction with the splines 702 will not change the position of the valve stem 106. It should be appreciated that, in various embodiments, the first drive mechanism 112 described herein may operate utilizing the interaction of either FIGS. 7A and 7B or FIGS. 8A and 8B. Furthermore, in embodiments where the second drive mechanism 114 uses an electric motor, the disengagement or continued engagement of the splines may also be used. It should be appreciated that, in various embodiments, the embodiment of FIGS. 8A and 8B may remove the need to realign the first drive mechanism 112 in the event the fail-safe operation mode is activated. For example, the second drive mechanism 114 may be reset and then continue operation using the first drive mechanism 112 without realigning the splines 700, 702.

Figure 9:
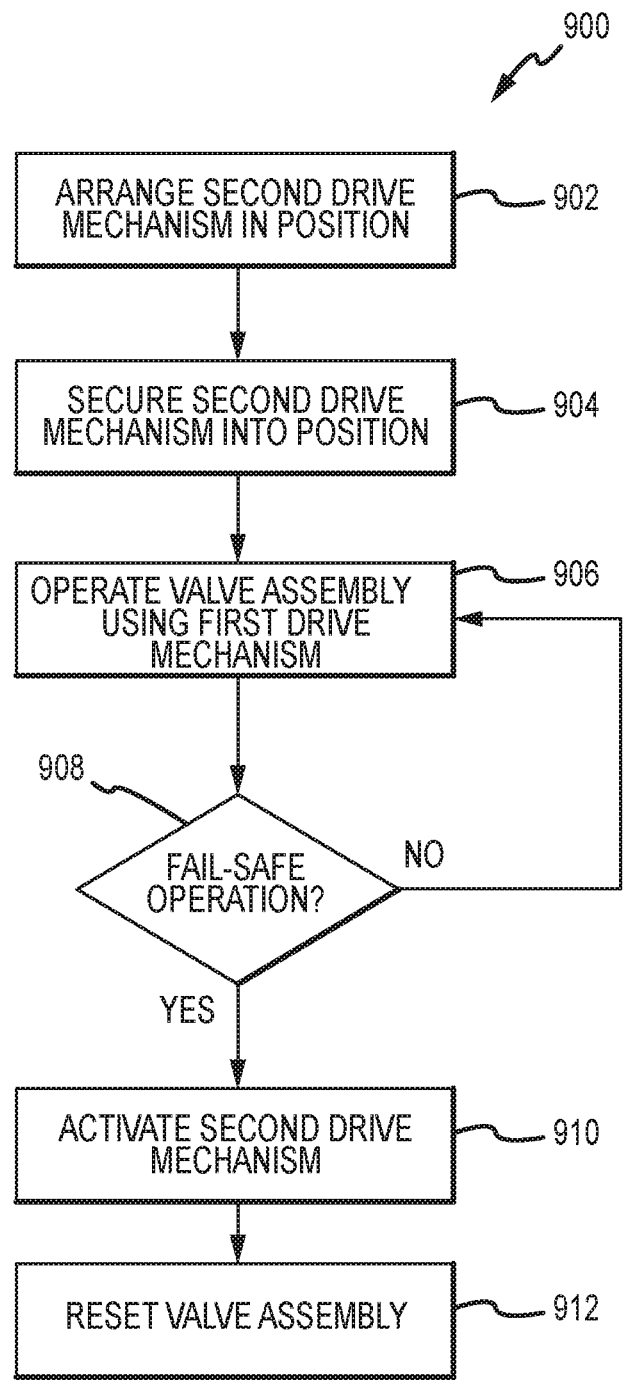
FIG. 9 is a flow chart of an embodiment of a method for operating a multi-mode valve assembly, in accordance with embodiments of the present disclosure.

FIG. 9 is a flow chart of a method 900 for utilizing a multi-mode valve assembly. It should be appreciated that the method may include more or fewer steps. Additionally, the steps may be performed in any order, or in parallel, unless specifically designated otherwise. In this example, a second drive mechanism is brought into position 902. For example, in embodiments where the second drive mechanism is a spring, the spring may be compressed, for example using the methods described herein. In various embodiments, bringing the second drive mechanism may also include attaching equipment, such as hydraulic equipment and the like. The second drive mechanism is also secured into position 904. For example, the retention members described herein may be used to fix the plate into position for activation in the event of the fail-safe mode. Additionally, fixing the equipment may include deactivating or not starting various support equipment, such as pumps and the like. Valve operation, for normal operating conditions, uses the first drive mechanism 906. For example, normal operating conditions may facilitate use of an electric motor that rotates a valve stem to translate the valve member been an open position and a closed position.

The method may determine if a fail-safe operating mode is activated 908. For example, the fail-safe operating mode may be triggered by detection of a certain operating pressure, or the like, by one or more sensors. If the fail-safe operating mode is activated, then the second drive mechanism may be used 910. For example, the second drive mechanism may drive the valve member toward the closed position. Thereafter, the valve assembly may be reset 912. For example, the second drive mechanism may be reset. However, if there is no detection of the fail-safe operating mode, normal operations using the first drive mechanism may continue. Accordingly, the valve assembly may be operated used two different drive mechanisms, which may be specified and designated for particular applications.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A valve assembly, comprising:
    a valve body;
    a valve member configured to translate between an open and a closed position within the valve body;
    a bonnet coupled to the valve body;
    a valve stem coupled to the valve member and extending through a bore of the bonnet; and
    an actuator coupled to the bonnet, the actuator comprising:
        a first drive mechanism positioned to translate a first driving force to the valve stem, the first drive mechanism being in operation during a normal operating condition; and
        a second drive mechanism positioned to translate a second driving force to the valve stem, the second drive mechanism being in operation during a fail-safe operating condition; wherein the first drive mechanism does not apply the first driving force during operation of the second drive mechanism; the first driving force is a rotational force and the second driving force is an axial force; a retention member releasably coupled to the second drive mechanism, wherein the retention member blocks operation of the second drive mechanism when engaged and enables operation of the second drive mechanism when released; and the retention member is at least one of a solenoid valve, a hydraulic force, a pneumatic force, or a vacuum force.

2. The valve assembly of claim 1, further comprising:
    a valve stroke system, the valve stroke system being coupled to the valve stem and being moveable along an axis of the valve stem along with the valve member, wherein the valve stroke system restricts axial travel of the valve stem.

3. The valve assembly of claim 1, wherein the second drive mechanism comprises a spring coupled to a plate, further comprising:
    a compression mechanism coupled to the second drive mechanism, wherein the compression mechanism comprises a rod coupled to the plate at a first end and to a ball screw at the second end, wherein rotation of the ball screw drives axial movement of the rod to compress the spring.

4. An actuator for use with a valve, comprising:
    a first drive mechanism for applying a first driving force to a valve stem, the first drive mechanism arranged within an actuator housing and configured to couple to the valve stem at an interface;
    a second drive mechanism for applying a second driving force to the valve stem, the second drive mechanism arranged, at least partially, within the actuator housing and configured to couple to the valve stem at a second interface; and
    a retention member associated with the second drive mechanism, the retention mechanism releasably maintaining the second drive mechanism at a first position, where the second driving force acts on the retention member, and enabling movement to a second position, where the second driving force acts on the valve stem; at least one of the first drive mechanism and the second drive mechanism is an electric motor; the interface comprises splines of the electric motor interacting with splines of the valve stem; and the retention member comprises: a piston; a cylinder, the cylinder receiving the piston and having an inlet axially lower than a piston head; and a valve associated with the cylinder, the valve blocking a working fluid at least one of entering or exiting the cylinder.

5. The actuator of claim 4, further comprising:
    a valve stroke system, the valve stroke system being coupled to the valve stem and being moveable along an axis of the valve stem, wherein the valve stroke system restricts axial travel of the valve stem.

6. The actuator of claim 4, wherein the first driving force is a rotational force and the second driving force is an axial force.

7. The actuator of claim 4, wherein the first drive mechanism does not apply the first driving force when the second drive mechanism applies the second driving force.

8. The actuator of claim 4, wherein the retention member is at least one of a solenoid valve, a hydraulic force, a pneumatic force, or a vacuum force.

9. The actuator of claim 4, wherein the second driving mechanism comprises:
    a biasing member; and
    a plate coupled to the biasing member and to the valve stem, the plate being driven axially by the biasing member.

10. The actuator of claim 4, wherein the valve is activated by a signal indicative of a fail-safe operation mode.

* * * * *